United States Patent [19]

Reifenhäuser

[11] Patent Number: 4,877,571
[45] Date of Patent: Oct. 31, 1989

[54] PROCESS FOR DEEP DRAWING COMPOSITE THERMOPLASTIC FOIL WITH A PVDC LAYER

[75] Inventor: Hans Reifenhäuser, Troisdorf, Fed. Rep. of Germany

[73] Assignee: Reifenhauser GmbH & Co. Maschinenfabrik, Troisdorf, Fed. Rep. of Germany

[21] Appl. No.: 117,520

[22] Filed: Nov. 4, 1987

[30] Foreign Application Priority Data

Nov. 5, 1986 [DE] Fed. Rep. of Germany ....... 3637744

[51] Int. Cl.⁴ ..................... B29C 51/10; B29C 51/14
[52] U.S. Cl. .................................. 264/512; 264/553; 264/292; 264/322; 425/388
[58] Field of Search ............... 264/512, 544, 545, 547, 264/553, 554, 292, 322; 425/384, 388

[56] References Cited

U.S. PATENT DOCUMENTS

| | | | |
|---|---|---|---|
| 4,076,570 | 2/1978 | Medley et al. | 156/244.11 |
| 4,404,162 | 9/1983 | Miki et al. | 264/512 |
| 4,579,784 | 4/1986 | Lemstra et al. | 264/291 |
| 4,714,580 | 12/1987 | Maruhashi et al. | 264/512 |

FOREIGN PATENT DOCUMENTS 1412152 10/1975 United Kingdom ............... 264/512

OTHER PUBLICATIONS

Plastics Engineering Handbook of the Society of the Plastics Industry, Inc., 4th Edition, 1976, pp. 46 and 47.

Primary Examiner—Jan H. Silbaugh
Assistant Examiner—Jill L. Heitbrink
Attorney, Agent, or Firm—Herbert Dubno

[57] ABSTRACT

A cuppable composite thermoplastic foil with a PVDC layer is subjected to a cupping process at a definite temperature and the container is formed by the cupping process, especially a vacuum cupping process. To provide a stronger and more stable container for food packaging the composite foil is heated to a temperature above the crystallization temperature of PVDC and because of that the crystal structure of the PVDC is broken up. The crystallization degree of the composite foil is reduced at least 50%, after which the composite foil is quenched at a temperature of less than 75° C., advantageously below 50° C. The cupping process is performed immediately after the quenching.

5 Claims, 1 Drawing Sheet

PROCESS FOR DEEP DRAWING COMPOSITE THERMOPLASTIC FOIL WITH A PVDC LAYER

FIELD OF THE INVENTION

My present invention relates to a process for making a plastic container and, more particularly, to a process for making a plastic container used to package food.

BACKGROUND OF THE INVENTION

In the known process a deep drawable composite thermoplastic foil with a PVDC layer is subjected to a deep drawing process at a definite temperature and the container is formed by the deep drawing process. By "PVDC" I mean polyvinylidene chloride plastic. The layer of PVDC acts as a barrier layer for preventing the passage of gases and aromatic substances as is of particular significance in the packaging of food.

The thermoplastic foil is heated to a temperature of about 150° C. and is deep drawn at this temperature in current practice. Thus a container is obtained which satisfies all requirements with regard to diffusion resistance but which is amendable to improvement in regard to its mechanical strength and stability. Because of the comparatively low strength and stability the known container has to have a comparatively large wall thickness to bear the given load or applied forces.

An improvement in regard to the mechanical strength and stability can be attained when the composite foil is subjected to cold forming. Because of that the plastic foil experiences a stretching which increases its strength. However the stretching can break the PVDC layer so that the diffusion resistance of the container manufactured no longer satisfies the requirements. The container made in the cold-forming process from the composite foil of the above described structure has not been found to be useful in practice.

OBJECTS OF THE INVENTION

It is an object of my invention to provide an improved plastic container, especially for packaging food, and a process for making the container which will obviate these drawbacks.

It is also an object of my invention to provide an improved plastic container which has a substantially higher mechanical strength and stability but whose diffusion resistance is not diminished.

It is another object of my invention to provide a process for making an improved stronger and more stable plastic container.

SUMMARY OF THE INVENTION

These objects and others which will become more readily apparent hereinafter are attained in accordance with my invention in a process for making a plastic container in which a deep drawable composite thermoplastic foil with a PVDC layer is subjected to a deep drawing process at a definite temperature and the container is formed by the deep drawing process, especially a vacuum deep drawing process.

According to my invention the composite thermoplastic foil is heated to a temperature above the crystallization temperature of PVDC. As a result the crystal structure of the PVDC layer is broken up and the crystallization degree is reduced by at least 50%, after which the composite thermoplastic foil is quenched to a temperature of less than 75° C., advantageously below 50° C. The deep drawing process is performed immediately after the quenching.

The diffusion resistance of the product of my process satisfies all requirements.

It is understood that on heating the crystal structure of the PVDC can be completely broken up.

Advantageously, quenching is effected to a temperature of about 40° C.

The quenching and the deep drawing process can be effected over a period of 15 to 300, preferably about 100 seconds. The quenching should occur with the highest possible cooling speed. During the deep drawing cooled molds can be used.

The described process proceeds successfully with all deep drawable thermoplastic plastic foils which can be coated with PVDC. The process according to my invention has proved especially satisfactory when polypropylene is used in the plastic foil.

My invention is based upon the discovery that the breaking strength of PVDC depends on the degree of crystallization. It is more or less exponentially larger with a decreasing degree of crystallization and is many times the conventional value with a vanishing degree of crystallization. My invention uses the up-to-now overlooked fact that the degree of crystallization of the PVDC after quenching is relatively small and increases with time—while in contrast the quenched deep drawable supporting foil experiences a cold strengthening in the deep drawing process which improves the composite foil and the stability of the container shape. Simultaneously the stability of the manufactured container increases—so that in the scope of my process a container of a certain size which must satisfy the predetermined mechanical requirements can be made with a reduced wall thickness.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
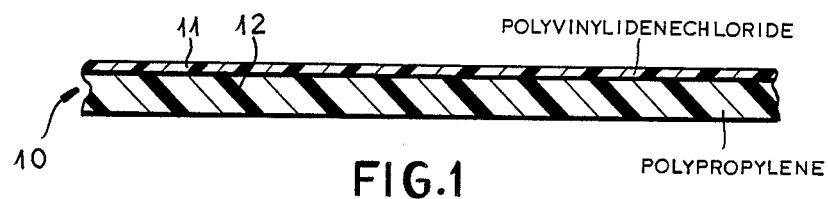
FIG. 1 is a diagrammatic section of a laminated foil of the type with which the process of the invention is concerned.

FIG. 1 shows a laminated foil 10 composed of a polypropylene layer 12 to which a layer of polyvinylidenechloride (PVDC) 11 has been applied. This foil 10, after treatment as has been and will be described is deep drawn in a deep-drawing mold 20 with a cavity 21 via a vacuum applied at 23 and communicated to the mold cavity by the passages 22. The mold is cooled by the passage of a coolant through the cooling passages 24.

Figure 3:
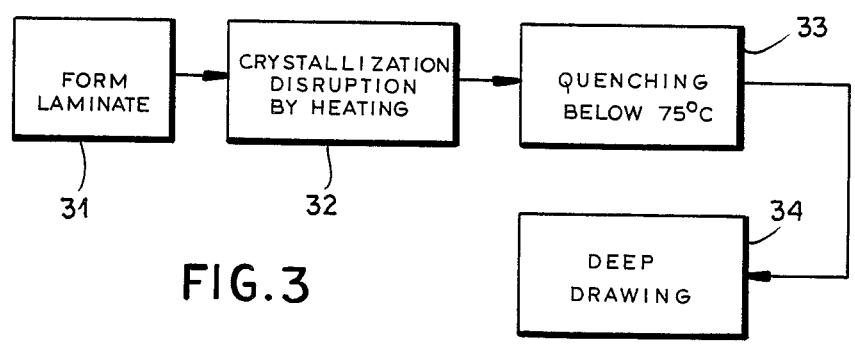
FIG. 3 is a block diagram of the method.

As can be seen from FIG. 3, the laminate 10, after being formed at 31 is heated to disrupt the crystalline structure of the PVDC at 32 so that the PVDC layer has its degree of crystallization reduced by at least 50%. The foil is then quenched below 75° C. at 33 and deep drawn at 34.

SPECIFIC EXAMPLE

Figure 2:
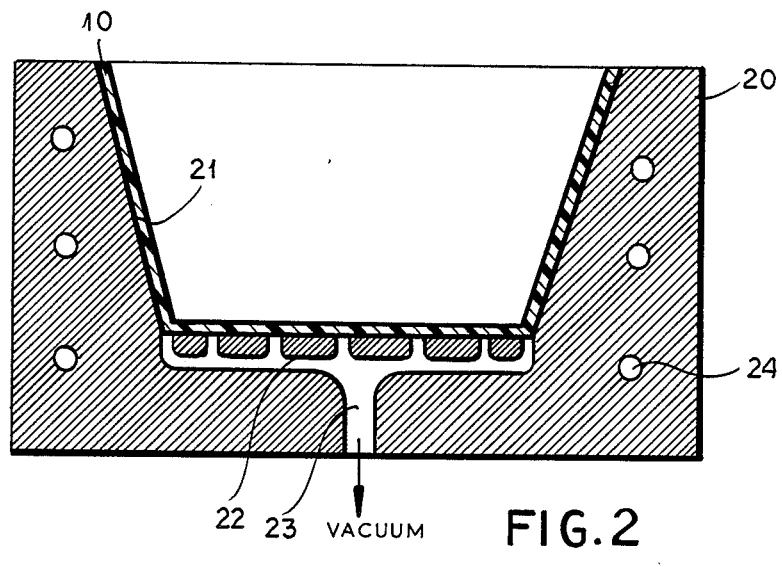
FIG. 2 is a section through a deep-drawing mold for use in the method.

A dairy-product cup of the configuration shown in FIG. 2 is formed by coating a 200 micrometer thick foil of polyvinylpropylene with a 20 micrometer thick PVDC layer. The crystallinity of the PVDC layer is reduced by about 75% by heating the foil to a temperature of 130° C. for five minutes. The foil is then quenched to 40° C. in cold water and immediately deep drawn in the cooled mold, so that the quenching and deep drawing are accomplished in a period of about 90 seconds.

I claim:

1. A process for making a plastic container in which a deep drawable composite thermoplastic foil with a PVDC layer is subjected to a deep drawing process in a mold at a definite temperature and said plastic container is formed by said deep drawing process, said process comprising the steps of:
   (a) heating said composite thermoplastic foil to a temperature above the crystallization temperature of said PVDC layer laminated thereto, said temperature of heating being over 130° C., and to disrupt the crystal structure of said PVDC layer and reduce the degree of crystallization thereof by at least 50%;
   (b) immediately thereafter quenching said composite thermoplastic foil to a temperature below 50° C.; and
   (c) thereafter deep drawing said foil upon the termination of the step (b), said quenching and deep drawing steps being effected in a time interval from 15 to 300 seconds.

2. The improvement defined in claim 1 wherein the temperature to which said foil is quenched is about 40° C.

3. The improvement defined in claim 1 wherein the deep drawing is effected in a cooled mold.

4. The improvement defined in claim 1 wherein said process uses a polypropylene plastic foil with said PVDC layer.

5. The process defined in claim 1 wherein said step (c) is a vacuum deep drawing step.

* * * * *